United States Patent [19]

Snell

[11] Patent Number: 5,756,941

[45] Date of Patent: May 26, 1998

[54] RETRACTABLE PEN TETHER FOR A DIGITIZER PEN AND METHOD OF ATTACHING A DIGITIZER PEN TO A DIGITIZER

[75] Inventor: Jeffery D. Snell, Oak Park, Calif.

[73] Assignee: Pacesetter, Inc., Sylmar, Calif.

[21] Appl. No.: 511,160

[22] Filed: Aug. 4, 1995

[51] Int. Cl.$^6$ .............................. G08C 21/00; G09C 3/02
[52] U.S. Cl. ................................ 178/18; 178/19; 345/179
[58] Field of Search ........................ 178/18, 19; 345/173, 345/179; 119/106, 109, 124; 242/376, 378, 384–7, 379, 381.3, 390.8

[56] References Cited

U.S. PATENT DOCUMENTS

| | | | |
|---|---|---|---|
| 3,776,198 | 12/1973 | Gehrke | 119/106 |
| 3,832,781 | 9/1974 | Flagge | 33/23 R |
| 4,106,165 | 8/1978 | Clowers | 242/381.3 |
| 4,328,767 | 5/1982 | Peterson | 119/109 |
| 4,402,472 | 9/1983 | Burtscher | 242/381.3 |
| 4,500,749 | 2/1985 | Khoshnevis | 178/18 |
| 4,506,336 | 3/1985 | Hird | 364/518 |
| 4,509,383 | 4/1985 | Yeh | 74/471 X |
| 4,813,146 | 3/1989 | Jaluzot | 33/1 M |
| 4,927,986 | 5/1990 | Daly | 178/18 |
| 4,959,511 | 9/1990 | Lloyd et al. | 178/18 |
| 5,004,870 | 4/1991 | Osborn | 178/18 |
| 5,022,351 | 6/1991 | Daniels | 119/124 |
| 5,033,474 | 7/1991 | Varelis et al. | 128/696 |
| 5,168,969 | 12/1992 | Mayhew | 191/12.2 R |
| 5,180,891 | 1/1993 | Trumbo | 178/18 |
| 5,200,913 | 4/1993 | Hawkins | 345/179 |
| 5,255,768 | 10/1993 | Kasper | 242/384.7 |
| 5,290,972 | 3/1994 | Someya | 178/18 |
| 5,353,904 | 10/1994 | Tacke | 194/210 |
| 5,422,442 | 6/1995 | Gouda | 178/18 |
| 5,483,262 | 1/1996 | Izutani | 345/179 |

Primary Examiner—Curtis Kuntz
Assistant Examiner—Vijay Shankar

[57] ABSTRACT

A retractable pen tether and a method for connecting a digitizer pen to a hand-held computer or other digitizer housing are provided. A tether attaches a digitizer pen to the digitizer to prevent the accidental loss of the digitizer pen. The tether length is variable so that an individual user can choose the desired amount of tether. The tether can be caused to retract into a cavity within the digitizer pen. The addition of the tether does not prevent storing the digitizer pen within a pen storage chamber of the digitizer housing. The tether mechanism and tether anchor are designed so that existing digitizer housings can be upgraded with tethered pens without extensive modifications to the digitizer housing.

25 Claims, 3 Drawing Sheets

RETRACTABLE PEN TETHER FOR A DIGITIZER PEN AND METHOD OF ATTACHING A DIGITIZER PEN TO A DIGITIZER

BACKGROUND OF THE INVENTION

This invention relates to digitizer pens. More particularly, this invention relates to retractable tethers that prevent the loss of digitizer pens.

The use of a digitizer pen with a digitizer is known. However, the interface between the digitizer and the digitizer pen has evolved over time. Early digitizers employed methods that connected the digitizer pen to the digitizer by one or more conductive wires. One example of such a digitizer is a digitizer that measured changes in resistance based on the position of the wired digitizer pen. These digitizer pens were not easily lost because they were connected to the digitizers by cords which carried the electrically conductive wires to the digitizer pens.

Subsequent digitizer pens were pen-shaped tools that allowed the user to apply pressure at a focused location on the input surface of a digitizer. The application of pressure served as the input to the digitizer.

Loss of such a pen-shaped tool, while inconvenient, was not a serious matter. Such pen-shaped tools contained no electrical or mechanical components and were thus relatively inexpensive to replace, and another appropriately shaped object could be used as a temporary substitute. The ready availability of substitutes reduced the seriousness of the temporary or even permanent loss of the pen-shaped tools.

Also, the digitizers were typically attached to a computer or computer terminal that was not portable. Thus, looking for a pen-shaped tool that was lost during use would usually entail searching a relatively small area around the computer or terminal.

Modern digitizer pens use internal circuits to alter a signal emitted from the digitizer. The digitizer senses the altered signal and thus senses the presence of the digitizer pen. Although these digitizer pens are wireless, such digitizer pens could be connected to the digitizer with a heavy cord as if the pen required one or more electrical connectors to operate. U.S. Pat. No. 4,927,986 discloses a system for retaining a digitizer pen that uses a heavy electric cord as part of a system for retaining and storing the digitizer pen. Although the 4,927,986 patent makes use of the electric cord as an electrical conductor, such a system could be applied to wireless digitizer pens which have no need for a heavy electric cord, by the addition of a cord without conductive wires.

However, such tether systems present certain disadvantages. For example, the weight of cord, while not precluding the use of the digitizer pen for its intended purpose, is an impairment to writing or otherwise moving the pen. Such an impairment can be a source of fatigue or frustration to users who use the digitizer pens for extended periods. The disadvantages caused by the weight of the cord are increased when the digitizer is in a hand-held computer that is used by users who are standing up, because then none of the cord weight is supported by a desk top.

A second disadvantage with connecting the digitizer pen with a heavy cord is that such cords are of a fixed length. Although the 4,927,986 patent discloses a system for wrapping the cord to store the pen, the cord, while in use, has a fixed length.

As evidenced by the development and commercial success of untethered pens, the disadvantages of the heavy cords were sufficient to justify a migration away from such cords.

An untethered digitizer pen has unfettered freedom of movement. Unfortunately, this freedom of movement can lead to a loss of the digitizer pen. For certain users or for certain applications where even temporary loss of the digitizer pen is a serious problem, an improved system for tethering a digitizer pen is needed.

For example, some users may find that they occasionally misplace the digitizer pens because they forget to store the digitizer pen in the designated storage chamber in the digitizer housing. Misplacement is expensive if the loss of the digitizer pen becomes permanent. Misplacement is also expensive in terms of time lost searching for the digitizer pen, whether or not the digitizer pen is permanently lost.

These disadvantages associated with lost digitizer pens are magnified when the user is carrying a hand-held computer, especially when the user carries the hand-held computer while moving between several locations. The risk of losing the digitizer pen is also increased when the user is frequently putting the digitizer pen down to allow use of the writing hand for some other task. Another related factor is the intermittency of use of the digitizer pen. An intermittent user would carry the hand-held computer and digitizer pen, but would engage in other activities such as using other pieces of equipment or performing other manual tasks. For an intermittent user, there could be a sizeable delay before loss of the digitizer pen is discovered. If the intermittent user is mobile, then the area to search for the digitizer pen could be quite large.

Another disadvantage with even temporary loss of a digitizer pen relates to the use today, by people engaged in production and delivery of services, of systems that have digitizers. Such uses sharply contrast with the earlier uses of digitizer pens by people engaged in designing or drafting. In such uses, the digitizer pen may be essential for the user to perform a task, and the delay caused by even a temporary loss of the digitizer pen may adversely effect the production of goods or the delivery of services.

An example of such a use of a digitizer pen and digitizer is described in commonly-assigned, copending U.S. patent application Ser. No. 08/510,367, filed Aug. 2, 1995, entitled "IMPROVED USER INTERFACE FOR AN IMPLANTABLE MEDICAL DEVICE USING AN INTEGRATED DIGITIZER DISPLAY SCREEN." The invention described involves a specialized pen-based computer called an analyzer-programmer that communicates telemetrically with an implantable medical device. The pen-based analyzer-programmer allows a physician to analyze the medical condition of a patient and then reset programming parameters of the implantable medical device to change the operation of the implantable medical device.

The temporary loss of a digitizer pen is a serious concern in an application involving medical treatment because even temporary loss of the digitizer pen may delay or impair the prompt delivery of medical care to a patient.

As noted, a digitizer pen tether is a welcome addition for some users. However, many users will wish to have untethered digitizer pens. Thus, manufacturers of hand-held computers may not want to manufacture products with tethered digitizer pens.

SUMMARY OF THE INVENTION

The present invention provides a tether for attaching a digitizer pen to a digitizer to prevent the accidental loss of the digitizer pen. The tether is unlike the heavy cords that serve as conduits for one or more electrically conductive wires to digitizer pens that use such wires. The tether length is variable so that an individual user can choose the desired amount of tether. The tether is retractable and the addition of the tether does not prevent storing the digitizer pen in a protective storage cavity of the digitizer. Thus, any digitizer housing, including a hand-held computer, can be modified to add a digitizer pen tether without modification to the interior of the digitizer housing—all that is required is a digitizer pen with an imbedded tether retraction mechanism provided in accordance with the principles of the present invention and attachment of the tether string to the outer surface of the digitizer housing.

Tether retraction is not automatic, so that a user may set the digitizer pen down without the tether mechanism causing an automatic and premature retraction of the tether. The tether retraction mechanism is powered so that the user does not need to manually re-wind the tether before storing the digitizer pen. The tether retraction mechanism and a tether anchor are designed so that existing digitizers can be upgraded with tethered pens without extensive modifications to the digitizer housing.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
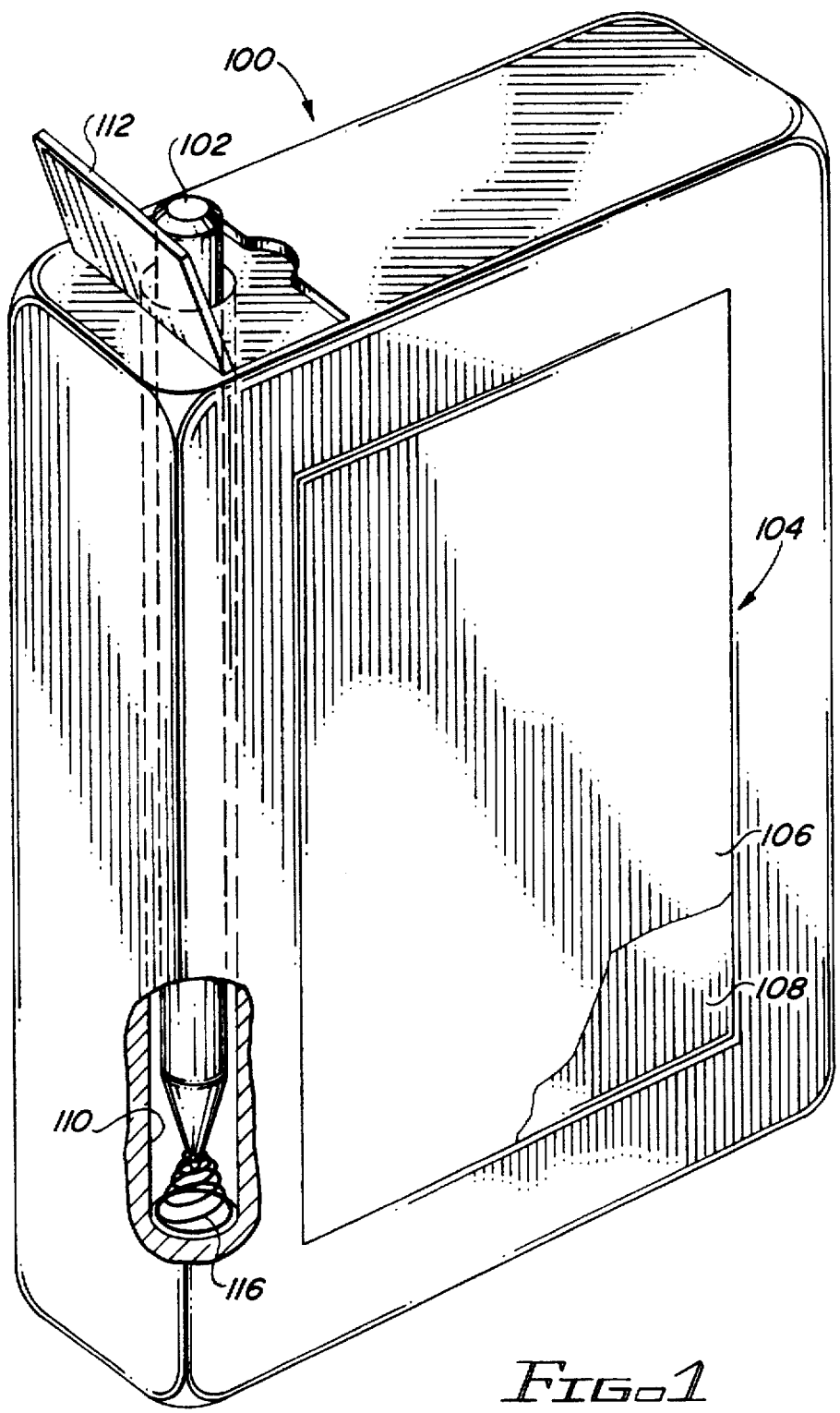
FIG. 1 is a perspective view of a hand-held computer illustrating a pen storage chamber in the hand-held computer.

Referring to FIG. 1, a hand-held computer 100, and a digitizer pen 102 which serves as an input device for the hand-held computer 100, are shown along with components of the hand-held computer 100. Unless otherwise specified, the term "pen" is used herein to indicate an input device to a digitizer associated with a display screen. The digitizer pen 102 can be used to write, draw, or select among choices presented on a digitizer display screen 104, which includes the majority of the front face of the hand-held computer 100. The digitizer display screen 104 includes a display 106 and a digitizer 108 which overlap one another. Typically, the digitizer 108 is underneath the display 106 but the principles of this invention still apply if the display (not shown) is covered by a transparent digitizer (not shown).

The hand-held computer 100 includes a pen storage chamber 110 which is accessed by raising a pen storage chamber lid 112. In one common configuration, the pen storage chamber 110 is oriented vertically and accessed from the top edge of the hand-held computer 100. The digitizer pen 102 is shown in the pen storage chamber 110. The digitizer pen 102 is stored by inserting the tip of the digitizer pen 102 into the pen storage chamber 110. The bottom of the pen storage chamber 110 has a spring 116 that causes the stored digitizer pen 102 to extend out of the pen storage chamber 110 when the pen storage chamber lid 112 is opened, so that the stored digitizer pen 102 can be easily removed from the pen storage chamber 110. The pen storage chamber lid 112 can be latched in the closed position by a pen storage chamber lid latch (not shown).

Figure 2:
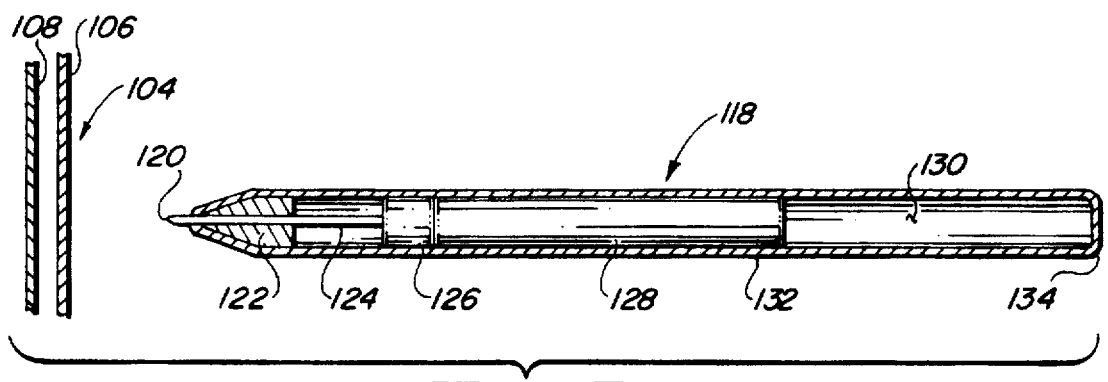
FIG. 2 is a cutaway view of a prior art digitizer pen showing the location of a pen cavity.

Turning now to FIG. 2, a digitizer pen 118 representative of the previously known pens is shown with its constituent parts. The digitizer pen 118 is shown perpendicular to the digitizer display screen 104 (which includes the display 106 and the digitizer 108). The operation of digitizer pens is not part of the present invention but is described to promote understanding of the invention. In brief, the digitizer pen 118 has electrical and mechanical components for altering a signal emitted by the digitizer 108 and these components are located close to a pen tip 120 of the digitizer pen 118.

When the pen tip 120 is not in contact with any object, a transducer 122 in the end of the digitizer pen 118 close to the pen tip 120 alters the signal emitted from the digitizer 108 in a first manner. If the digitizer pen 118 is sufficiently close to the digitizer 108, then the digitizer 108 senses the location of the digitizer pen 118 and knows from the type of altered signal that the pen tip 120 is not in contact with an object. The sensory range of the digitizer 108 is approximately one-quarter inch. Thus the digitizer 108 can provide input to the hand-held computer 100 (FIG. 1) so that visual feedback can be displayed for the user on the display 106.

When the pen tip 120 makes contact with the surface of the display 106, the pen tip 120 moves slightly into the digitizer pen 118. This slight movement causes a pen tip shaft 124 to move through a hollow center of the transducer 122. The movement of the pen tip shaft 124 activates a pressure switch 126 causing a pen circuit 128 to alter the operation of the transducer 122 so that the transducer 122 alters the signal emitted from the digitizer 108 in a second manner. The digitizer 108 can distinguish this alteration from the alteration made when the pen tip 120 is not in contact with any object. Thus, the hand-held computer 100 (FIG. 1) knows whether the digitizer pen 118 is writing or is merely close to the surface of the display 106.

A pen cavity 130 exists within a pen body 132 at a top end 134 of the digitizer pen 118 which is the end away from the pen tip 120. The pen cavity 130 is simply unused space in the pen body 132. The unused space occurs because the pen body 132 is manufactured in the size and shape of a standard writing pen while the various components are all located near the pen tip 120.

Another variant of digitizer pen is an ultrasonic digitizer pen (not shown) that emits a first ultrasonic signal which is picked up by several microphones (not shown) mounted as part of an ultrasonic digitizer screen (not shown). The measurements from the several microphones are used to calculate the position of the ultrasonic digitizer pen. Depression of a pen tip (not shown) in the ultrasonic digitizer pen causes a second ultrasonic signal to be emitted which indicates to the digitizer microphones that the pen is writing. The ultrasonic signal must be emitted from near the tip of the ultrasonic digitizer pen in order for the digitizer microphones to accurately calculate the location of the pen tip.

Ultrasonic digitizer pens can be used with the present invention if the components in the ultrasonic pen are arranged to form a pen cavity like the pen cavity 130 shown in FIG. 2.

Figure 3:
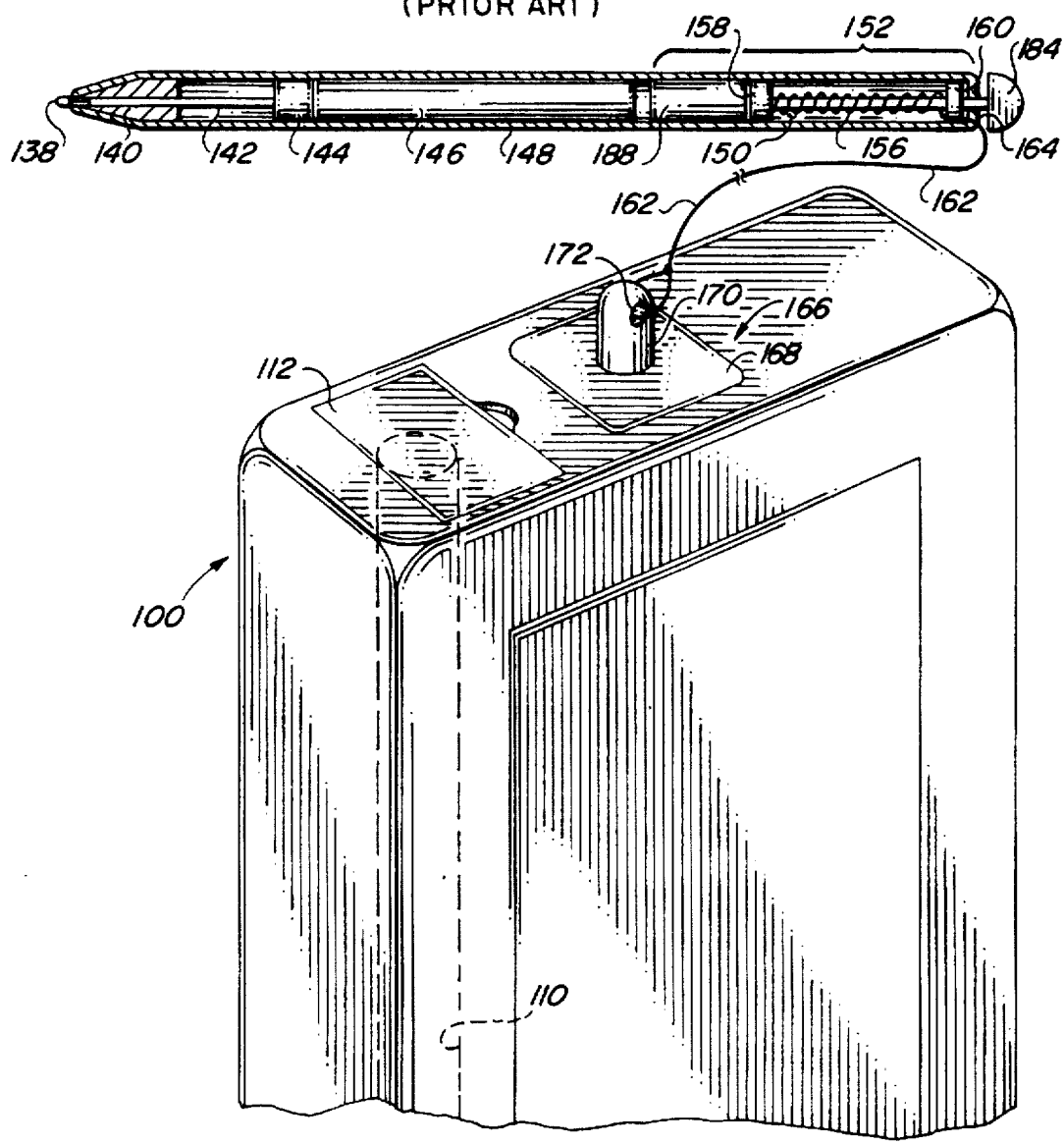
FIG. 3 is a cutaway view of a digitizer pen having digitizer pen tether components occupying space in the pen cavity and a pen tether anchor mounted on the surface of a hand-held computer in accordance with the principles of the present invention.

Turning now to FIG. 3, a preferred embodiment of a digitizer pen 136 embodying the present invention is shown with the conventional elements shown in FIG. 2, namely a pen tip 138, a transducer 140, a pen tip shaft 142, a pressure switch 144, a pen circuit 146, a pen body 148, and a pen cavity 150. The pen cavity 150 contains a retraction end 152 of a pen tether of the present invention. The retraction end 152 includes a tether spool 154 mounted along the longitudinal axis of the digitizer pen 136. The tether spool 154 has a spindle 156, a first flange 158 at the pen tip end of the spindle 156, a second flange 160 at the other end of the spindle 156. The first flange 158 is sized so that the gap between the first flange 158 and the inner wall of the pen body 148 is less than approximately one half the minimum diameter of a tether string 162. The second flange 160 is sized so that the gap between the second flange 160 and the inner wall of the pen body 148 is larger than the minimum diameter of the tether string 162. Note that minimum diameter may not equal the maximum diameter. The cross section of the tether string 162 may be something other than a perfect circle, such as when the tether string 162 is made by braiding or when the tether string 162 is ribbon shaped. The desired gaps can be created by making the diameter of the second flange 160 smaller than the diameter of the first flange 158, or making the pen cavity 150 slightly larger in the region of the second flange 160, or making the pen cavity 150 slightly narrower in the region of the first flange 158.

The tether string 162 is attached to the tether spool 154 and runs between the second flange 160 and the pen body 148, then exits the pen body 148 at a top end 164. The distal end of the tether string 162 is attached to a pen tether anchor 166 which includes an anchor base 168 and a tether string mount 170. The tether string mount 170 can be as simple as a protrusion from the anchor base 168 having an eyehole 172 through which the tether string 162 may be threaded. The distal end of the tether string 162 is threaded through the eyehole 172 and tied. Other conventional methods of attaching a string may be used to attach the tether string 162 to the anchor base 168. If the hand-held computer 100 (FIG. 1) has an eyehole near the pen storage chamber 110, then the tether string 162 may be tied directly to that eyehole on the hand-held computer 100 rather than the eyehole 172 on the protrusion from the anchor base 168. In this case, the anchor base 168 is not needed. In any case, the attachment method preferably should form a connection that does not come loose until desired by the user, such as when the tether string 168 is being replaced.

Figure 4:
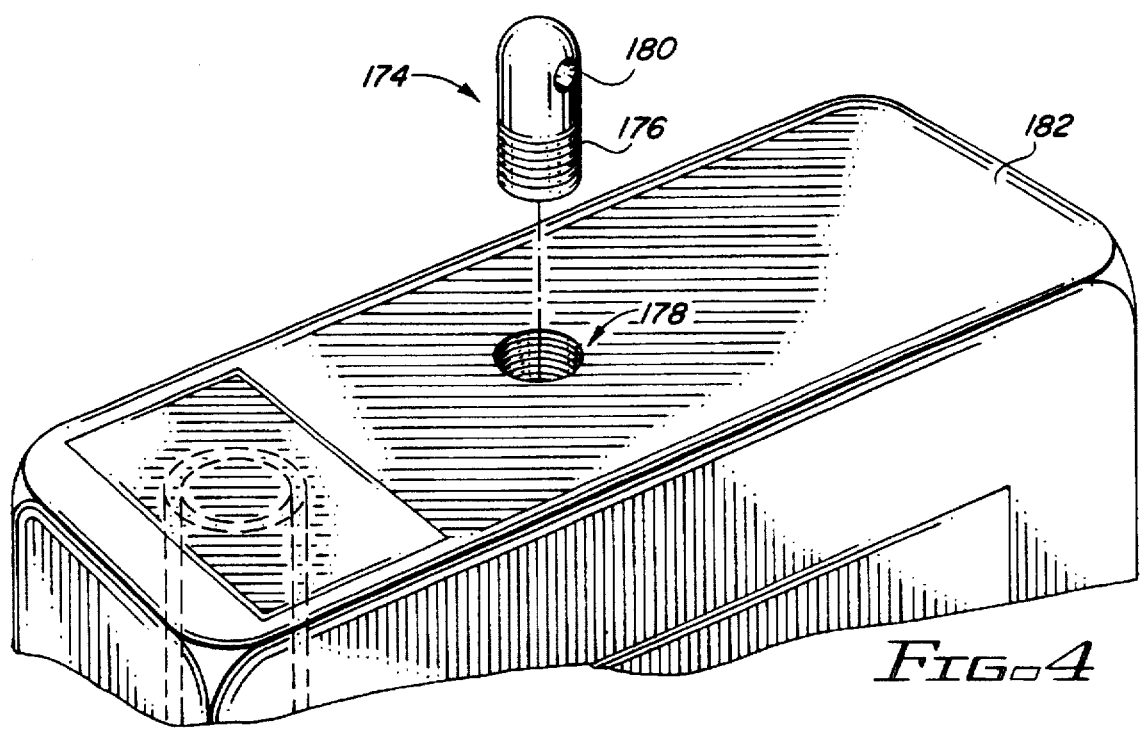
FIG. 4 is perspective view of a portion of a hand-held computer having an alternative embodiment of a pen tether anchor in accordance with the principles of the present invention.

Turning now to FIG. 4, an alternative embodiment of the invention that uses a pen tether anchor protrusion 174 which has threads that match threads of a threaded hole 178 provided on a hand-held computer 182 for the attachment of accessories. The pen tether anchor protrusion 174 has an eyehole 180 for tying one end of a tether string (not shown for this embodiment) to the pen tether anchor protrusion 174.

Returning now to FIG. 3, a preferred embodiment of the tether string 162 is a multifilament string that is sufficiently pliable to wrap around the tether spool 154. The strength of the tether string 162 should be sufficient to prevent accidental breakage of the tether string 162 but should not prevent someone from forcibly removing the digitizer pen 136 from the hand-held computer 100. Ideally, the breaking strength of the tether string 162 should be such that pulling the digitizer pen 136 away from the hand-held computer 100 should break the tether string 162 rather than the components in a tether retraction mechanism (discussed below), the pen tether anchor 166, or the attachment between the anchor base 168 and the hand-held computer 100. Optionally, the attachment of the tether string 162 to the tether string mount 170 could be of a type that releases the tether string 162 at a force below the breaking strength of the tether string 162 to further protect the components from damage.

In the preferred embodiment of the present invention the tether string 162 is made from a condensation polymer obtained from ethylene glycol and terephthalic acid (commonly known by the trademark DACRON, owned by E. I. du Pont de Nemours & Company). Such a polymer has a high-tensile strength, high resistance to stretching, and good resistance to degradation by abrasion. The preferred embodiment of the present invention uses a braided multifilament string rather than a monofilament string to increase the flexibility and surface roughness of the tether string 162. The flexibility allows the tether string 162 to pass through the gap to the tether spool 154, and to be wound upon the tether spool 154. The increased surface roughness provides the high friction required when a tether tension release (discussed below) operates by applying pressure against the tether string 162 to prevent retraction of the tether string 162. Other suitable materials include non-absorbable braided suture material and upholstery thread.

The tether string 162 is lengthened by moving a tether tension release 184 into a first position. In FIG. 3 the tether tension release 184 is a movable cap on the top end 164 of the digitizer pen 136. Movement of the tether tension release 184 into the first position causes contact between the tether tension release 184 and the tether string 162. With the tether tension release 184 in the first position, the tether string 162 can be pulled out of the top end 164 of the pen body 148 by exerting sufficient pulling force on the tether string 162 to overcome the friction caused by the contact between the tether string 162 and the tether tension release 184 in the first position. As the tether string 162 is pulled out of the pen body 148, the tether spool 154 rotates to allow the tether string 162 to unwind. As the tether spool 154 rotates, a tether retraction mechanism 188 resists the rotation of the tether spool 154, thus requiring a greater pulling force to cause the continued removal of the tether string 162 from the pen body 148. A portion of the energy expended to remove the tether string 162 from the pen body 148 is stored in the tether retraction mechanism 188. The energy could be stored in a metal spring, rubber band, or other device capable of storing potential energy. In the preferred embodiment, the tether retraction mechanism 188 stores potential energy in a metal torsion spring.

While the tether tension release 184 is in the first position, the friction caused by the contact between the tether string 162 and the tether tension release 184 prevents the tether retraction mechanism 188 from rotating the tether string spool 154 to rewind and retract the tether string 162. Moving the tether tension release 184 to a second position reduces the friction caused by contact between the tether string 162 and the tether tension release 184. The reduction in friction allows the tether retraction mechanism 188 to rotate the tether spool 154 thus causing the retraction of the extended tether string 162.

The tether string 162 can be partially retracted by the following sequence of steps. In the first step, the tether tension release 184 is moved to the second position to allow the retraction of the tether string 162. In the second step, the retraction is stopped by holding the digitizer pen 136 with sufficient force to match the force of the tether retraction mechanism 188. In the third step, the tether tension release 184 is moved back to the first position, after the partial retraction of the tether string 162. After these three steps, the digitizer pen 136 can be used with the reduced length of extended tether string 162.

As described above, the tether tension release 184 could be a moveable cap on the top end 164 of the digitizer pen 136. In the preferred embodiment, the cap is moved downward to constrain a channel (not shown) within the digitizer pen 136. The tether string 162 moves within this channel when being extended or retracted. Constraining the channel applies additional friction to the tether string 162 which resists movement of the tether string 162. Movement of the tether tension release 184 could constrain the channel in several other ways. For example, a tether tension release (not shown) could be implemented with a cap (not shown) that is moved away from the pen tip 138 to move to the first position, or a tether tension release (not shown) could be implemented with a cap (not shown) that is rotated to move the tether tension release from the first position to the second position and back again.

The tension tether release does not have to use a moving cap at all. The tether tension release could be controlled by a button (not shown) or a slide mechanism (not shown) placed on the side of the pen body 148. Another type of tether tension release (not shown) can be built into the pen body 148 so that twisting the top end 164 of the pen body 148 relative to the pen tip end of the pen body 148 moves the tether tension release (not shown) from the first position to the second position and vice versa. Another type of tether tension release (not shown) could be moved from the first position to the second position by moving the top end 164 of the pen body 148 relative to the pen tip end of the pen body 148.

The tether tension release 184 described above uses a friction-based mechanism that applies friction to the tether string 162. Other forms of a tether tension release mechanism (not shown) could use either a friction-based mechanism, or a gear/clutch mechanism to prevent movement of the tether spool 154 or to interfere with the action of the tether retraction mechanism 188. Another type of tether tension release (not shown) could employ a ratchet wheel (not shown) with a pawl (not shown). The ratchet wheel would be connected to the tether spool 154 such that while the pawl is in the first position the tether spool 154 is not able to rotate in the direction that rewinds the tether string 162. Moving the pawl to a second position so that the pawl does not contact the ratchet wheel would allow retraction.

In another alternative embodiment (not shown), the tether tension release (not shown) is triggered by fully extending the tether string 162 to move a tether tension release (not shown) to the second position to allow retraction of the tether string 162. The act of fully extending the tether string 162 can be employed as a triggering mechanism for the tether tension release (not shown) in several ways. One way is to route the tether string 162 through an eyehole (not shown) in an actuator (not shown), and place a knot (not shown) or other expansion of tether string cross section near the end of the tether string 162. The knot or other expansion of tether string cross section being unable to pass through the eyehole presses against the actuator and moves it to actuate the tether tension release. A second way to translate the act of fully extending the tether string 162 into a triggering mechanism is to spring mount the tether spool 154 so that the empty tether spool 154 moves under the force applied to extend additional tether string 162, and this movement triggers the tether tension release.

In an alternative embodiment (not shown) the tether tension release 184 would be replaced by a "pull-pull" mechanism. Such a mechanism is familiar to users of electrical devices with retractable electrical cords or of window shades. The user would pull the pen body 148 out of the pen storage chamber 110 and the tether string 162 would be extended against the resistance of the tether retraction mechanism 188. The user may extend the tether string 162 to any desired length. To retract the tether string 162, the user pulls out a small additional amount of tether string 162 but does so with a rapid tug, and then releases the pulling force. The pull-pull mechanism is engaged by the tug and release motion and the tether retraction mechanism 188 uses the potential energy stored during the removal of the tether string 162 to rewind the tether string 162 onto the tether spring spool 154. The retraction can be stopped by exerting sufficient pulling force to overcome the force exerted by the tether retraction mechanism 188 and then extending the tether string 162 slightly but without using the tug and release motion.

Figure 5:
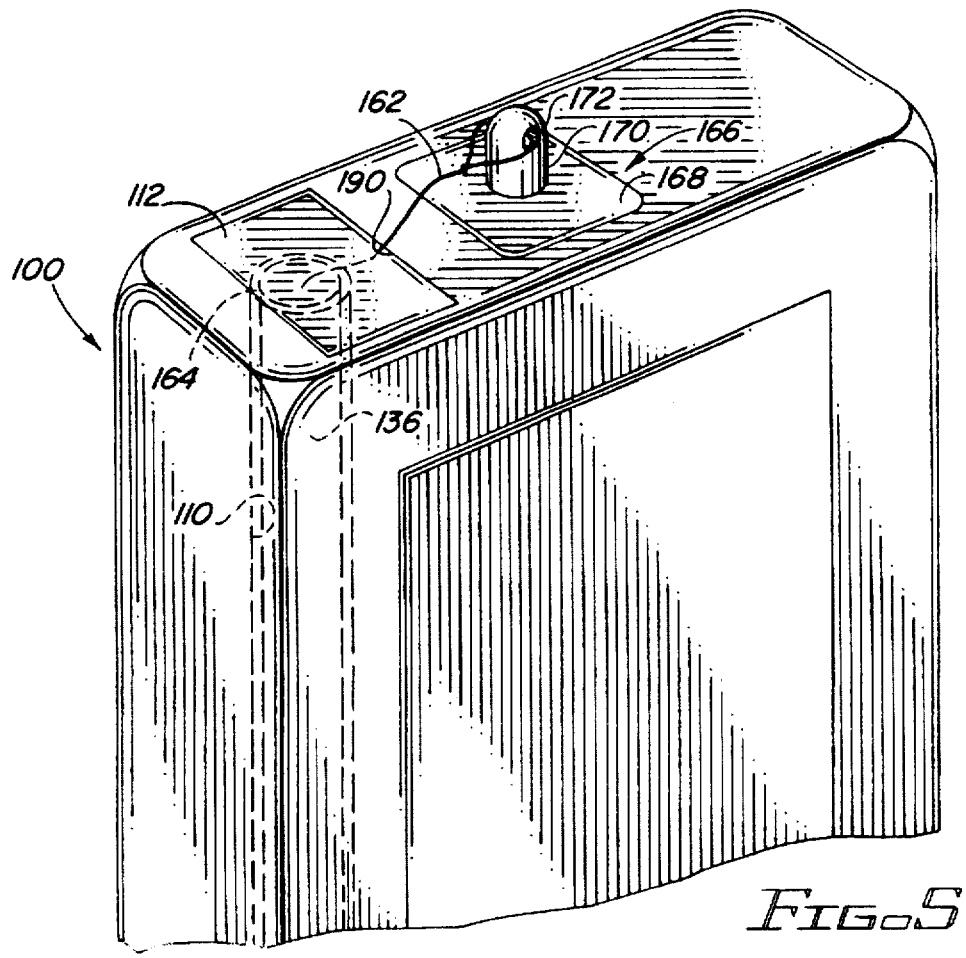
FIG. 5 is a perspective view of a portion of a hand-held computer containing a stored digitizer pen with a tether mechanism of the present invention.

Turning now to FIG. 5, the hand-held computer 100 is shown with the anchor base 168 mounted close to the pen storage chamber 110. The anchor base 168 may be attached to the hand-held computer 100 with adhesives, screws, or other fasteners. Before placing the digitizer pen 136 into the pen storage chamber 110, the tether tension release 184 (FIG. 3) is moved to the second position. After the pen storage chamber lid 112 is opened, the digitizer pen 136 is placed into the pen storage chamber 110 with the pen tip 138 at the bottom of the pen storage chamber 110. Because the tether tension release 184 (FIG. 3) is in the second position, the tether retraction mechanism 188 (FIG. 3) retracts any slack in the tether string 162.

The pen storage chamber lid 112 is then closed with the tether string 162 extending from the top end 164 of the stored digitizer pen 136 to the pen tether anchor 166. If the gap between the pen storage chamber lid 112 and the hand-held computer 100 is less than the minimum diameter of the tether string 162 then a small notch 190 can be added to the pen storage chamber lid 112.

Although the present invention has been described with reference to a hand-held computer, the teachings can be applied to a digitizer that is part of a computer terminal or to a digitizer that is a separate device. The tether string would be attached to the housing of whatever device contains the digitizer, whether the device is a hand-held computer, computer terminal, separate digitizer, or some other device.

Thus, a retractable tether for attaching a digitizer pen to a digitizer is provided. One skilled in the art will appreciate that the present invention can be practiced by other than the described embodiments, which are presented for purposes of illustration and not of limitation, and the present invention is limited only by the claims which follow.

What is claimed is:

1. A digitizer pen for use with a digitizer, said digitizer pen coupled to a tethering apparatus for attaching the digitizer pen to a digitizer housing, the apparatus comprising:

a tether string having a first end attached to said digitizer housing and a second end attached to said digitizer pen; and tether retraction means for retracting said tether string wherein:

said tether retraction means is attached to said digitizer pen; and said second end of said tether string is attached to said digitizer pen via said tether retraction means.

2. The apparatus of claim 1, further comprising retraction release means for selectively interrupting retraction of said tether string by said tether retraction means.

3. The apparatus of claim 1, wherein:

said digitizer pen has a cavity therein; and said tether retraction means is positioned within said cavity.

4. The apparatus of claim 1, wherein said tether retraction means comprises:

a tether spool for storing a retracted portion of said tether string and for releasing the stored portion of said tether string when said digitizer pen is moving away from said digitizer housing; and a tether retraction mechanism for storing potential energy as said tether spool releases stored portions of said tether string and for using said stored potential energy to cause said tether spool to retract said tether string when said digitizer pen is moving towards said digitizer housing.

5. The apparatus of claim 4, further comprising a retraction release means for selectively interrupting retraction of said tether string by said tether retraction means.

6. The apparatus of claim 5, wherein said retraction release means further comprises a tether tension release mechanism which when moved to a first position prevents said tether retraction mechanism from causing said tether spool to retract portions of said tether string and when moved to a second position allows said tether retraction mechanism to cause said tether spool to retract portions of said tether string.

7. The apparatus of claim 1, wherein said tether string is made of a condensation polymer obtained from ethylene glycol and terephthalic acid.

8. The apparatus of claim 1, further comprising a pen tether anchor for attaching said first end of said tether string to said digitizer housing.

9. The apparatus of claim 8, wherein said pen tether anchor is connected to said digitizer housing with an adhesive.

10. The apparatus of claim 8, wherein said pen tether anchor is screwed into a threaded hole of said digitizer housing.

11. A digitizer pen for use with a digitizer, said digitizer coupled to an apparatus for securing the digitizer pen to a digitizer housing, said digitizer pen having a first end, a second end, and a cavity substantially bounded by an interior surface of said digitizer pen, said cavity being exposed to the exterior of said digitizer pen by an orifice in said second end, the apparatus comprising:

a tether string having a long dimension and cross section perpendicular to the long dimension, having a first end for attachment to said digitizer housing, and a second end which extends through said orifice into said cavity;

a tether spool, positioned within said cavity and attached to said second end of said tether string, for storing said tether string and for releasing said stored tether string when said digitizer pen is moving away from said digitizer housing; and a tether retraction mechanism, positioned within said cavity, for storing potential energy as said tether spool releases said stored tether string and for using said stored potential energy to cause said tether spool to retract said tether string when said digitizer pen is moving towards said digitizer housing.

12. The apparatus of claim 11, wherein said tether spool comprises:

a spindle, rotatably mounted along a longitudinal axis of said digitizer pen, about which retracted portions of said tether string are wound;

a first flange disposed on an end of said spindle closest to said first end of said digitizer pen, said first flange separated from said interior surface of said digitizer pen by a first gap having a maximum gap area less than the area of said cross section; and a second flange disposed on an end of said spindle closest to said second end of said digitizer pen, said second flange separated from said interior surface by a second gap having a minimum gap area greater than the area of said cross section, whereby:

said orifice and said second gap form a passage through which said tether string passes as said tether string is retracted and released.

13. The apparatus of claim 11, further comprising a tether tension release mechanism which when moved to a first position prevents said tether retraction mechanism from causing said tether spool to retract said tether string and when moved to a second position allows said tether retraction mechanism to cause said tether spool to retract said tether string.

14. The apparatus of claim 11, further comprising a pen tether anchor for attaching said first end of said tether string to said digitizer housing.

15. The apparatus of claim 14, wherein said pen tether anchor is connected to said digitizer housing with an adhesive.

16. The apparatus of claim 14, wherein said pen tether anchor is screwed into a threaded hole of said digitizer housing.

17. The apparatus of claim 11, wherein said tether string is made of a condensation polymer obtained from ethylene glycol and terephthalic acid.

18. A method of securing a digitizer pen to a digitizer housing, said digitizer pen having a first end, a second end, and a cavity substantially bounded by an interior surface of said digitizer pen, said cavity being exposed to the exterior of said digitizer pen by an orifice in said second end, the method comprising the steps of:

attaching a first end of a tether string to said digitizer housing, said tether string having a long dimension and cross section perpendicular to the long dimension;

extending a second end of said tether string through said orifice into said cavity;

attaching said second end of said tether string to a tether spool which is positioned within said cavity and which stores said tether string and releases said tether string when said digitizer pen is moving away from said digitizer housing; and coupling to said tether spool a tether retraction mechanism which stores potential energy as said tether spool releases said tether string and which uses said stored potential energy to cause said tether spool to retract said tether string when said digitizer pen is moving towards said digitizer housing.

19. The method of claim 18, wherein said step of attaching said second end of said tether string to said tether spool comprises the steps of:

rotatably mounting a spindle along a longitudinal axis of said digitizer pen, about which said tether string is wound;

disposing a first flange on an end of said spindle closest to said first end of said digitizer pen, said first flange separated from said interior surface of said digitizer pen by a first gap having a maximum gap area less than the area of said cross section; and disposing a second flange on an end of said spindle closest to said second end of said digitizer pen, said second flange separated from said interior surface by a second gap having a minimum gap area greater than the area of said cross section, whereby:

said orifice and said second gap form a passage through which said tether string passes as said tether string is retracted and released.

20. The method of claim 18, further comprising the step of providing a tether tension release mechanism which when moved to a first position prevents said tether retraction mechanism from causing said tether spool to retract said tether string and when moved to a second position allows said tether retraction mechanism to cause said tether spool to retract said tether string.

21. The method of claim 18, wherein said step of attaching said first end of said tether string to said digitizer housing comprises the step of attaching said first end of said tether string to a pen tether anchor on said digitizer housing.

22. The method of claim 21, further comprising the step of connecting said pen tether anchor to said digitizer housing with an adhesive.

23. The method of claim 21, further comprising the step of screwing said pen tether anchor into a threaded hole of said digitizer housing.

24. The method of claim 18, wherein said tether string is made of a condensation polymer obtained from ethylene glycol and terephthalic acid.

25. A retractable tethered digitizer pen for use in a computer system having a digitizer housing, the pen comprising:

a pen body;

a tether string having a first end attached to said digitizer housing and a second end; and tether retraction means for retracting said tether string wherein:

said tether retraction means is attached to said pen body; and said second end of said tether string is attached to said digitizer pen via said tether retraction means.

* * * * *